United States Patent
Brew et al.

(10) Patent No.: US 10,223,137 B2
(45) Date of Patent: Mar. 5, 2019

(54) DATA PROCESSING

(71) Applicant: International Business Machines Corporation, Armonk, NY (US)

(72) Inventors: Anthony T. Brew, Cork (IE); Nathan Cullen, Cork (IE); Fuguo Huang, Cork (IE); Vinh Tuan Thai, Cork (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 608 days.

(21) Appl. No.: 14/960,613

(22) Filed: Dec. 7, 2015

(65) Prior Publication Data
US 2017/0160876 A1     Jun. 8, 2017

(51) Int. Cl.
G06F 3/048     (2013.01)
G06F 9/451     (2018.01)
G06F 17/30    (2006.01)

(52) U.S. Cl.
CPC ........ G06F 9/453 (2018.02); G06F 17/30693 (2013.01)

(58) Field of Classification Search
CPC ......... G06F 17/30705; G06F 17/30734; G06F 17/30864
See application file for complete search history.

(56) References Cited

U.S. PATENT DOCUMENTS

| | | | |
|---|---|---|---|
| 7,127,675 B1 | 10/2006 | Kates et al. | |
| 7,526,722 B2 | 4/2009 | Wadhwa | |
| 7,895,519 B1 | 2/2011 | Allegrezza et al. | |
| 8,200,661 B1* | 6/2012 | Pearce | G06F 17/30867 707/721 |
| 8,577,868 B1* | 11/2013 | Zamir | G06F 17/30884 707/710 |
| 9,460,191 B1* | 10/2016 | Gaucher | G06F 17/30601 |
| 2003/0074368 A1* | 4/2003 | Schuetze | G06F 17/3025 |
| 2005/0222982 A1* | 10/2005 | Paczkowski | G06F 17/30864 |
| 2006/0036991 A1 | 2/2006 | Biazetti et al. | |
| 2010/0017289 A1* | 1/2010 | Sah | G06Q 30/02 705/14.49 |
| 2010/0058006 A1* | 3/2010 | Murthy | G06F 12/122 711/156 |

(Continued)

FOREIGN PATENT DOCUMENTS

WO     2015102845 A1     7/2015

OTHER PUBLICATIONS

A. Capobianco, et al.,"Online help for the general public: specific design issues and recommendations", Springer-Verlag, Oct. 8, 2003, pp. 1-16.

*Primary Examiner* — Justin S Lee
(74) *Attorney, Agent, or Firm* — Cantor Colburn LLP; Richard Wilhelm (57) ABSTRACT

A method of identifying topics which a user requires help with when using a software program is described. For each of a plurality of help documents, the help document is associated with a set of topics and their relative prevalence within the help document. User access to the help documents is tracked during use of the software program. Topics in relation to which help was required during use of the software program are identified based on an amount of access to one or more of the help documents and the relative prevalence of topics within the accessed help documents.

18 Claims, 3 Drawing Sheets

(56) References Cited

U.S. PATENT DOCUMENTS

| | | | |
|---|---|---|---|
| 2010/0161613 A1* | 6/2010 | Rao | G06F 17/30616 707/741 |
| 2010/0280985 A1* | 11/2010 | Duchon | G06N 7/005 706/52 |
| 2010/0313118 A1* | 12/2010 | Acquaviva | G06F 17/30734 715/254 |
| 2011/0106743 A1* | 5/2011 | Duchon | G06F 17/30705 706/46 |
| 2012/0066226 A1* | 3/2012 | Moshrefi | G06F 17/30256 707/740 |
| 2015/0248476 A1* | 9/2015 | Weissinger | G06F 17/30516 707/737 |
| 2015/0269138 A1* | 9/2015 | Parris | G06F 17/2785 704/9 |
| 2016/0085866 A1* | 3/2016 | Venkatesh | G06F 17/30684 707/730 |
| 2017/0124192 A1* | 5/2017 | Cerveny | G06F 17/30864 |
| 2017/0140118 A1* | 5/2017 | Haddad | G16H 40/63 |
| 2017/0161790 A1* | 6/2017 | Kobylkin | G06Q 30/0273 |
| 2017/0316450 A1* | 11/2017 | Kobylkin | G06Q 30/0244 |

* cited by examiner

DATA PROCESSING

BACKGROUND

The present invention relates to a data processing apparatus and method for identifying topics which a user requires help with when using a software program.

In the design of software systems, providing a positive user experience is an important objective, as the user experience with a software product can ultimately be a basis to decide whether the product meets the needs of its users. There are many existing methods in the broad field of User Centered Design/Human Computer Interaction to achieve this goal at various stages of a software development life cycle, for instance, ethnographic studies, design critique and AB testing. With most software being continuously delivered, there is a need for iterative design activities, to make sure new features do not introduce usability problems, or if they do, identify and address the issues promptly. One such activity is gathering user feedback on usage of the product. This method is effective, yet costly, as it requires time and effort from both users and the product team.

SUMMARY

Embodiments include methods, systems and computer program products for identifying topics which a user requires help with when using a software program. Aspects include associating with the help document a set of topics and their relative prevalence within the help document for each of a plurality of help documents. Aspects also include tracking user access to the help documents during use of the software program and identifying topics in relation to which help was required during use of the software program based on an amount of access to one or more of the help documents and the relative prevalence of topics within the accessed help documents. In one embodiment, the set of help documents are accessed via a context-sensitive help system.

DETAILED DESCRIPTION

Figure 1:
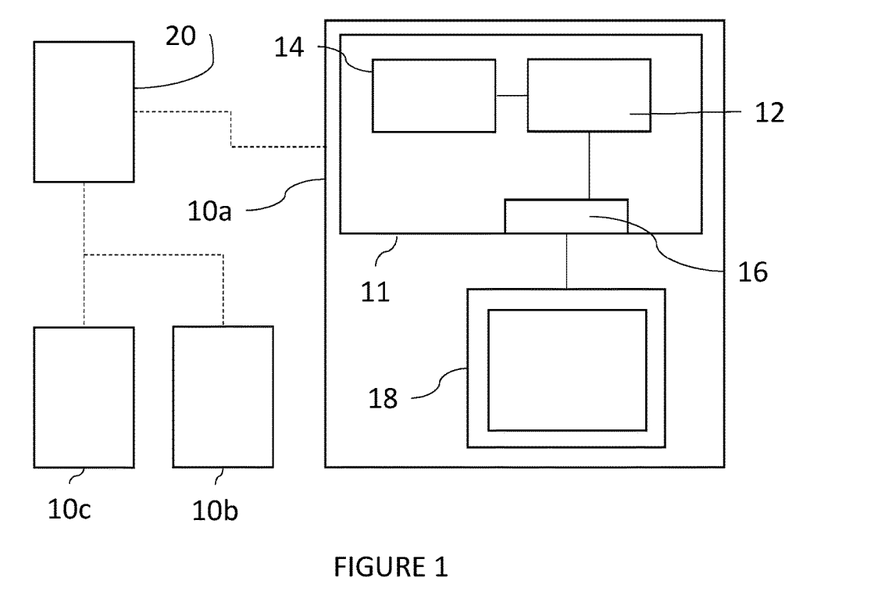
FIG. 1 schematically illustrates, in accordance with one embodiment, a set of user devices running a software program and accessing context-sensitive online help at a server via the Internet.

With reference to FIG. 1, three data processing apparatuses 10a, 10b, 10c are shown, each of which has installed thereon a software program and a context-sensitive help function for assisting the program user in using the software program. The data processing apparatus 10a can be seen to comprise a computer 11 and a display device 18. The computer 11 in turn comprises a processor 12, a memory 14 and a display controller 16 via which the computer 11 is connected to the external display device 18. It will be appreciated that other components may be present, but need not be described here since they may be of conventional nature and are not helpful in explaining the operation of the present technique. Each of the data processing apparatuses 10b, 10c have a configuration similar to that of the data processing apparatus 10a, but such configurations are not shown in FIG. 1 in the interests of clarity. Each of the data processing apparatuses 10a, 10b, 10c are in communication with a server 20 which has a function of monitoring program user access to help documentation, to be utilised by an expert user in considering the efficacy of the software program. The data processing apparatuses 10a, 10b, 10c each report certain information to the server 20 to enable it to perform this function. The reported information is described in more detail below. It will be understood that two types of users are discussed herein—a "program user", which is the user operating the software program and accessing the help documentation for assistance, and an "expert user", which is the user monitoring the analysis of access to the help documentation by the program users.

Figure 2:
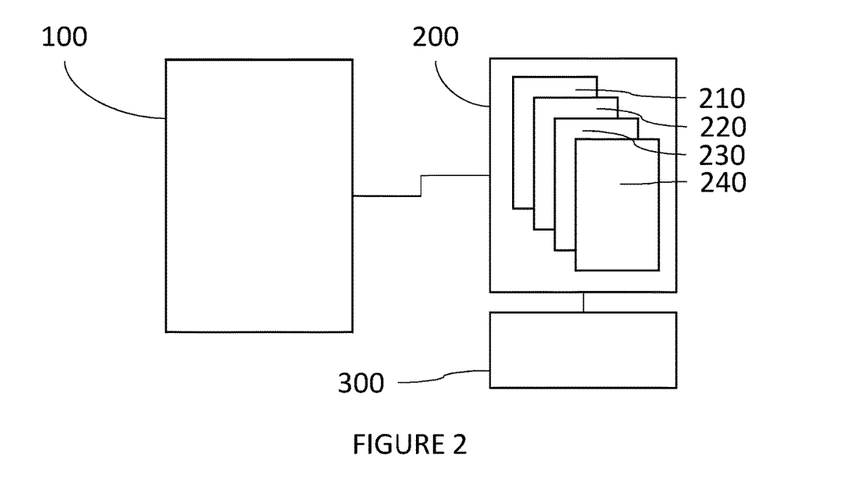
FIG. 2 schematically illustrates, in accordance with one embodiment, a software program and associated context sensitive help system.

With reference to FIG. 2, three software articles are shown, these being a software program 100, a context sensitive help system 200 and a help monitoring system 300. The context sensitive help system 200 includes a set of help documents 210, 220, 230 which can be accessed by the user of the software program 100 via the context sensitive help system 200. The software program 100 is installed on each of the data processing apparatuses 10a, 10b, 10c, while the context sensitive help system 200 is provided remotely at the server 20 and accessed over the Internet when required. It will however be appreciated that the help system 200 could be provided locally at the data processing apparatus 10a, provided that a suitable data export mechanism is provided to inform the help monitoring system 300 of access to the help documents at the apparatus 10a. It will be understood that in practice the software program 100 may be installed on, and the help system 200 accessed from, a large number of devices, and that access to the help system 200 from each of these can be tracked by the help monitoring system 300, which is preferably installed at the server 20 along with the help system 200 itself. It will be appreciated that, in this way, the help monitoring system 300 is able to aggregate information from multiple program user's access to help documentation to build up an overall picture of help document access.

The present technique seeks to reveal to a user experience expert (utilising the help monitoring system 300) main topics causing confusion, concern or issues for the program users of a software system. In particular, the present technique seeks to provide an efficient way of identifying usability issues and/or subjects encountered by customers through the classification of the main items considered within the accompanying help system. This technique is not intended to replace the interaction between the product team and the program users, rather, it augments the process with useful information that can help focus the efforts of those seeking to identify user experience issues.

The present technique focuses on the program user action of accessing an online help facility and the collection of statistics based on that action. Previous techniques have involved the collection of statistics by monitoring how online help is accessed; however, deeper analysis would require labelling of each help item into one or more category, via tags for example, so that some numerical summarization can be achieved. This level of categorisation is difficult to obtain, and even more so with complex software systems where many experts input and advice may be required. The process of categorisation is often known as "labelling" or "tagging" and the terms may be used interchangeably forthwith. Even if the labelling of a set of help documents can be made available, meaningful actionable aggregation across such items can still be a challenging task. For instance, given a document, there are two major problems with using labels/tags. Firstly, different annotators (humans performing the annotation) often give different tags with the same or very similar meaning, such as "server" or "websrv". Secondly, tags are given in a discreet manner, that is, if a document is tagged with "tag1", "tag2", "tag3", these 3 tags have equal weights when it comes to summarization. However, in practice the content of a help document is not uniformly distributed in terms of those tags, it could be mostly (for example 90%) about "tag1", but only slightly (for example 5% each) about "tag2" and "tag3". As a result, these problems could easily produce misleading summary statistics based on tags.

The present technique uses clustered access to help documentation via algorithms such as Latent Dirichlet Allocation to assist in the aggregated grouping of how program users are experiencing difficulties within the set of products that they are accessing. The present technique specifically targets this issue, using help documentation clustering on the exit points (current context) from a software product to find significant grouped patterns, and therefore helps software developers and designers to easily identify the difficulties experienced by program users within a set of applications. Described herein is a method to identify program user experience issues via advanced text analysis of the accompanying technical documentation of a software system and its usage. This method can be carried out without costly interaction between the program users and the product/design team being required, and yet meaningful statistics can be obtained to analyse and identify potential user experience issues. This means that this method can be used at scale.

Figure 3:
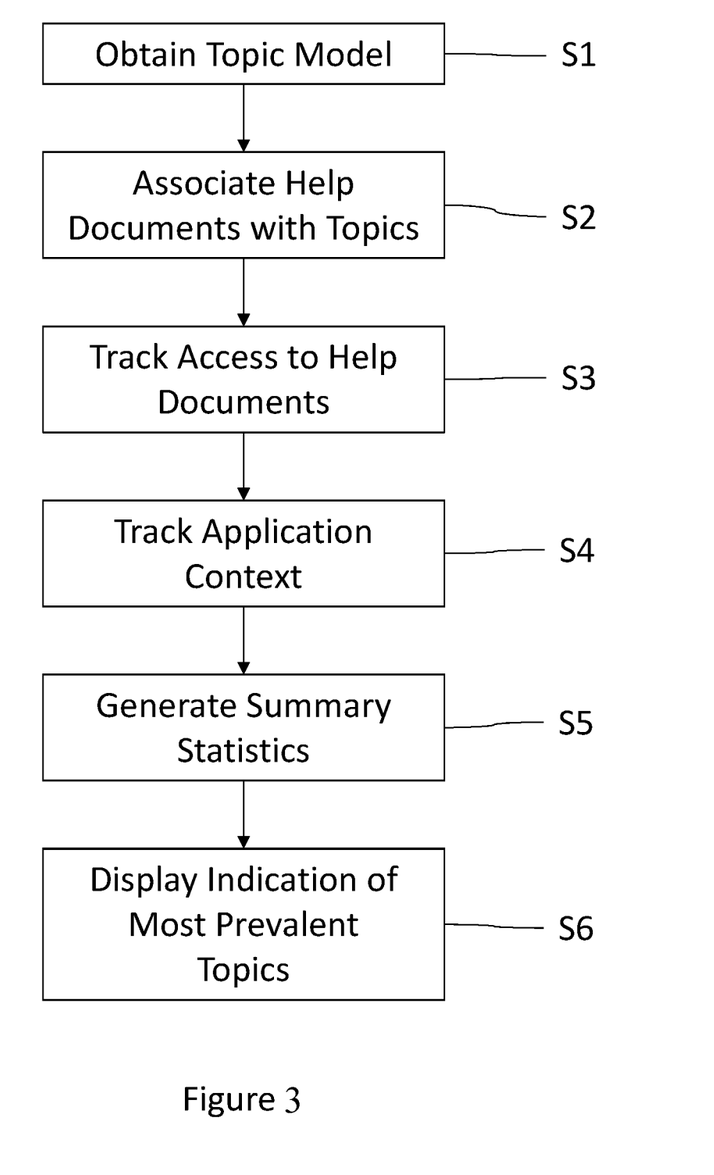
FIG. 3 schematically illustrates, in accordance with one embodiment, the logical functions carried out by a help monitoring system.

Referring to FIG. 3, the various software functions of the help monitoring system 300 are shown. In particular, the help monitoring system comprises a document processor 310 for forming a topic model and associating topics and their prevalence with help documents, a database 320 for storing the topic model generated by the document processor 320, a document tracker 330 for detecting when a program user accesses a help document, a context tracker 340 for identifying what context the software program 100 was in when a help document is accessed, a topic analyser 350 for applying the topic model to the document accesses and contexts to determine which topics have been accessed and conduct various other analysis of the available data, and a dashboard tool 360 for displaying topic analysis information to an expert user, and being responsive to an expert user interaction to make other information regarding help documentation access available to the expert user.

Figure 4:
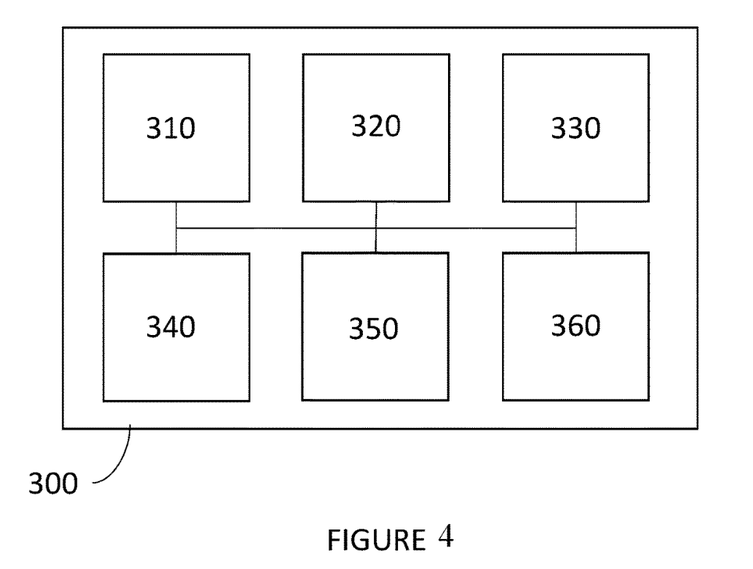
FIG. 4 is a schematic flow diagram of a method, in accordance with one embodiment, of identifying topics which a program user requires help with when using a software program.

Referring to FIG. 4, the present technique of identifying topics which a program user requires help with when using a software program comprises the following sequence of steps, carried out by the various logical entities of FIG. 3. These will first be outlined briefly, and then described in greater depth. At a step S1, the document processor 310 performs text mining on the set of textual documents provided as (context-sensitive) help to obtain a topic model. At a step S2, the document processor 310 associates help documents with the topics identified together with their proportions, and stores these in the database 320. At a step S3, the document tracker 330 tracks which help documents are opened during the usage of the software system. At a step S4, the context tracker 340 tracks the context within the software system where the help documentation was requested. It will be appreciated that the steps S3 and S4 are carried out in parallel. At a step S5, based on the topic model decomposition obtained in the step S1, the topic analyser converts the statistics obtained in the step S3 into a tracking of which topics the program users encountered while consulting the help documentation. At a step S6, the dashboard 360 indicates (by way of visual display for example) the most prevalent topics identified in step S5 as areas where the program users needed help the most and, therefore, areas where there are potential user experience issues. It will be appreciated that the steps S1 and S2 (preparatory steps) will typically carried out in advance, the step S3 and S4 (document and context tracking) will be carried out in relation to multiple program users over a period of use of a program of generally days, weeks or months, and the steps S5 and S6 will generally be carried out at the end of this period on all of the data collected during this period.

In more detail, at the step S1 the set of help documents that accompany a software offering is subjected to processing through a topic modelling technique such as the Latent Dirichlet Allocation (LDA) algorithm to generate a topic model for the set of help documents. In particular, for each document in the set of help documents, the help document is associated with a set of topics and their relative prevalence within the help document. The LDA algorithm is a natural language algorithm which clusters words within a document into topics. LDA can be used to obtain the distribution of topics in each document and the distribution of words in each topic. For instance, LDA can learn from a corpus of help documents that the following words are associated with certain topics with their corresponding weights in each topic (shown in brackets): topic 1: "server" (0.55), "websrv" (0.3), "srv" (0.15); topic 2: "UI" (0.3), "interface" (0.3), "interaction" (0.3), "usability" (0.1); topic 3: "database" (0.25), "db" (0.25), "sql" (0.25), "injection" (0.15), "partition" (0.1).

It will therefore be understood that within a particular topic, different words may occur with different probabilities. The words associated with a particular topic may be used, either automatically or via manual intervention, to select a particular name/label for the topic with which they are associated. Further, LDA is able to learn that topics are not evenly distributed within a document, but have different weightings. A sample help document may for example contain the following distribution (relative prevalence) of topics: topic 1 (0.6), topic 2 (0.2), topic 3 (0.2). The weighting may for example be based on the proportion of the words in a document which are allocated (in the above-described manner) to different topics. In the example in the preceding sentence, the distribution of 0.6, 0.2, 0.2 might result from a 1,000 word document in which 600 of the words are associated with topic 1, 200 of the words are associated with topic 2 and 200 of the words are associated with topic 3. In practice, not all words in a document need be associated with a topic (such as "the", "an", "and" etc.), and the words associated with a topic might be considered the "key words" for that topic.

It should be noted that the use of the Latent Dirichlet Allocation (LDA) algorithm can help address some of the issues associated with obtaining summary statistics of tags/labels, since LDA allows grouping of different tokens belonging to the same topic, as well as identification of the proportion of various topics contained within a document.

This text analysis step can be carried out before the help documents are deployed into a help/technical documentation system. It can be carried out again each time the help/technical documentation is updated. It will be understood that this is just one of a number of potential algorithms which can be used to form a topic model of a document or set of documents.

Considering the step S2 in more detail, once a topic model is learned, each help document will be associated with a distribution of topics, and each topic associated with a distribution of words, as shown above. Such a decomposition of topics as mixtures of word tokens and documents as mixtures of topics are persisted into a data store for use in the step S5. The persistence can be achieved by storing the data into a database or serialising the data into a text file.

Considering the step S3 in more detail, while the end-users of the software program carry out their tasks, they might request help from a help system. Such interactions with the help system are tracked so that usage statistics can be collected. For instance, the date/time of and the active time period stayed in access for each help document can be kept. The active time period stayed in access is the period when the program user "stays on" a document, which may for example be the time the user keeps the document open, or the time the help document spends in an active window on the program user's display. The actual implementation of this may be carried out in a number of ways. For example, for an online help system, the apparatus 10a may request the server 20 to provide a particular help document, and these requests may be tracked by the help monitoring system 300, which is in communication with the help system 200. As a result, the server 20 will be aware of which help documents have been requested by the program user. For a local help system, a reporting module may be required at the data processing apparatus 10a to inform the help monitoring system 300 of what help documents have been accessed.

Considering the step S4 in more detail, the context within the application where the help was viewed is tracked. Generally, the context is the process currently being performed by the application. This context may take many forms, for example which function of the application the program user is accessing or interacting with, an installation process while the program users are performing installation of the software, a fault monitoring process while the program user traverses a list of alarms/events in a performance monitoring system, or a fault investigation process while the program user is investigating a specific alarm generated by, for example, IBM® Predictive Insights. IBM is a trademarks of International Business Machines Corporation, registered in many jurisdictions worldwide. The actual implementation of this may be carried out in a number of ways. For example, for an online context-sensitive help system 200, a request to the server 20 from the apparatus 10a to access online help documentation may indicate the current program context in order that the context-sensitive help system 200 can provide help for the situation that is associated with the current state of the program. As a result, the server 20 will be aware of both which help documents have been requested by the program user (from the request), and also of the context of the program at the time of the request (again, from the request itself). For a local help system, a reporting module may be required at the data processing apparatus 10a to inform the help monitoring system 300 of what help documents have been accessed, and from what program context.

Considering the step S5 in more detail, based on the topic model decomposition obtained in the step S1, the statistics obtained in the steps S3 and S4 are converted into a tracking of which topics the program users encountered while consulting the help documentation. In this way, it is possible to identify topics which the program user required help with during use of the software program based on an amount of access to one or more of the help documents and the relative prevalence of topics within the accessed help documents. In particular, based on the information gathered at the step S3 regarding which help documents were requested, and when that happened, as well as the topic distribution within each help document stored at the step S2, it is possible to derive how much help was requested on each topic by generating certain summary statistics, or metrics, representative of topic access. Two possible summary statistics, referred to as access weight (which is intended to represent how much a help topic was requested) and topic-based context weight (which is intended to represent which kind of context the program users were in when they request help on a specific topic), are described below. However, it will be appreciated that other representative metrics may be formulated. Without any loss of generality, assuming that: the help system has 2 documents, document 1 has following distribution (relative prevalence) of topics: topic 1 (0.6), topic 2 (0.2), topic 3 (0.2), document 2 has following distribution (relative prevalence) of topics: topic 1 (0.05), topic 2 (0.05), topic 3 (0.9). Over a period of one month, document 1 was accessed 2 times and document 2 was accessed 5 times.

An access weight, which is indicative of an amount of user access to a particular topic (irrespective of the program context from which the help topics are accessed) can be calculated for each topic included within the accessed help documents. The access weight is a function of the sum over all accessed documents of a product of the prevalence of the topic in the document and the amount of access to the document during use of the software program.

$$\text{Access Weight } [?](\text{topic}) = [?] \sum_n p \times a$$

Where n is the number of help documents, p is the prevalence of a topic within a document, and a is the number of times that document has been accessed.

So, for an illustrative set of 2 help documents, containing 3 topics: access weight for topic 1=0.6×2+0.05×5=1.45; access weight for topic 2=0.2×2+0.05×5=0.65; access weight for topic 3=0.2×2+0.9×5=4.9. It can therefore be seen that topic 3 is the most frequently accessed topic, followed by topic 1, followed by topic 2.

A topic-based context weight indicative of the amount of access to that topic from a given application context can be calculated for each topic included within the accessed help documents. The topic based context weight may be a function of the sum over all accessed documents of a product of the prevalence of the topic in the document and the amount of access to the document from the given application context.

$$\text{Topic-based Context Weight } [?](\text{topic, context}) = \sum_n p \times b$$

Where n is the number of help documents, p is the prevalence of a topic within a document, and b is the number of times that document has been accessed from the present context.

For each topic, retrieve all documents which contain it, then retain documents that were accessed over a time period, and get the recorded context when each of those documents was accessed, then aggregate the context weights. For instance, for topic 1, there are 2 documents containing it, both were accessed over a month, and when document 1 was requested, its associated contexts were "traverse a list of alarms/events" and "investigating a specific alarm", when document 2 was requested, its associated context was "mediation tool installation" for all the 5 times when it was accessed, then for topic 1, its context weights are as follows: context weight for topic 1 & "traverse a list of alarms/events": 0.6×1=0.6; context weight for topic 1 & "investigating a specific alarm": 0.6×1=0.6; and context weight for topic 1 & "mediation tool installation": 0.05×5=0.25. It can therefore be seen that topic 1 is most frequently accessed from the contexts "traverse a list of alarms/events" and "investigating a specific alarm", and less frequently accessed from the context "mediation tool installation".

Another factor impacting the weight calculation may be dwell time on a help document, that is, the amount of time that a program user spends looking at that document. Thus, the LDA weight calculation method can be enhanced by the dwell time factor. In the above example, both "traverse a list of alarms/events" and "investigating a specific alarm" were requested once over a month, but in this case assume the overall time that program users spent on each were: 30 minutes and 40 minutes. Thus, the dwell time based weight can be calculated: context weight for topic 1 & "traverse a list of alarms/events": 0.6×30=18; and context weight for topic 1 & "investigating a specific alarm": 0.6×40=24. It can therefore be seen that topic 1 is dwelt on less from the context "traverse a list of alarms/events" than from the context "investigating a specific alarm". It will be appreciated also that a dwell time based metric could also be used for access weight.

More generally, the statistics represent the amount of access to a topic, optionally as a function of the program context from which the help was sought.

The amount of access may for example be either or both of a number of times the help document has been accessed and a duration of access to the help document. By combining the analysis results of a plurality of program users, it is possible to identify topics with which program users required the most help during use of the software program.

Figure 5:
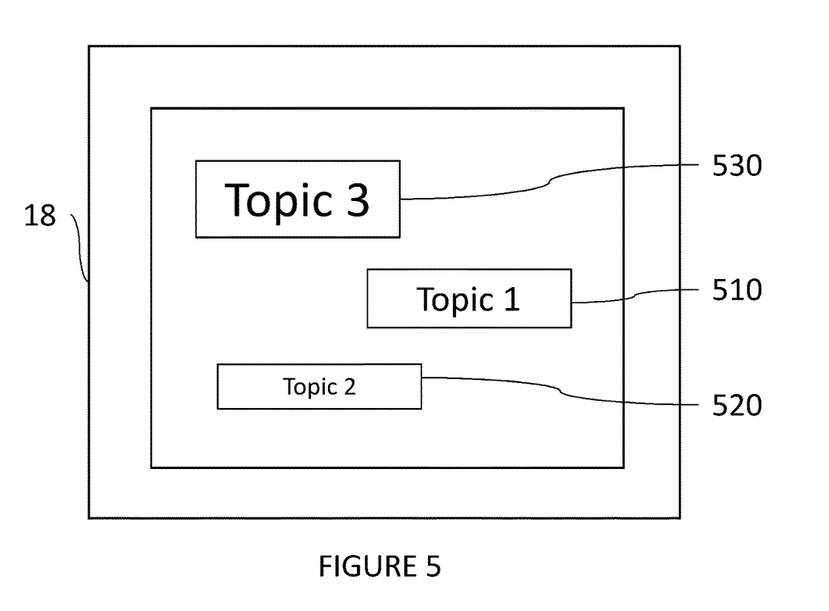
FIG. 5 schematically illustrates an example user interface for displaying an identification of frequently accessed topics within the help documentation.

Considering the step S6 in more detail, based on the summary statistics that are collected and derived at the step S5, a dashboard can be used to present the results to an expert user. The identified topics can be selected by an expert user to obtain information regarding access to the topic by a program user. The identified topics could be presented on the dashboard as a word cloud of topic labels in which the display size of a topic label is proportional to an amount of access to that topic. In particular, the most viewed topic (that is, the topic with the highest access weight) would be displayed in the largest font, with the font size gradually getting smaller for each subsequent topic with lower access weights. An example of such a dashboard is shown in FIG. 5, in which the display device 18 is shown to be displaying three topics—Topic 1 510, Topic 2 520 and Topic 3 530. It can be seen that Topic 3 530 is shown in the largest font, indicating that it is the most frequently accessed topic. Topic 2 520 is shown in the smallest font, indicating that it is the least frequently accessed topic. Topic 1 510 is shown in a smaller font than Topic 3 530 but in a larger font than Topic 2 520, indicating that it has been accessed more frequently than Topic 2 520 but less frequently than Topic 3 530. It will be appreciated that other presentational techniques could be used, such as colour coding or pictorial representations. For example, topics which have not been accessed at all might be shown in a different colour, or as greyed out text. The expert user may be able to interact with the dashboard to switch between showing access weights (as is the case with FIG. 5), or topic-based context weights— which the expert user would have the facility of restricting to a particular context for example. By clicking on any given topic a user of the dashboard can gain access to the information obtained by the system based on the accumulated client usage, such as the number of times a specific topic was considered by program users (which could be displayed as a percentage), or an indication of an exact point in a user scenario (context) where a help subject was required by a user of the software product and the topic considered by the program user(s). This may take the form of a list of contexts, ordered by their topic-based context weights as calculated at the step S5.

The system allows the user experience expert to gain early knowledge of the topics causing program users issues. This method may allow the user experience expert to target the specific topics identified when a one-to-one customer session can be arranged. The information revealed is also of great benefit to the Information Developer (ID) designing and implementing the help system accompanying the software system. The information presented through the system will allow the Information Developer give more time and energy to the subjects getting greater traffic, and also identify those topics not being considered by program users, and prune the help provided accordingly. As result, it would be beneficial to include in the set of information items exposed by the dashboard a list of contexts from which help has been requested, ordered by their topic based context weights.

Various other useful information may be derived from the summary statistics. For example, topics covered by the set of help documents which are least accessed by program users can be identified as those topics having the lowest access weights. Topics not accessed at all will be identified as those having an access weight of zero. Help documents within the set of help documents which are least accessed by program users can also readily be identified from the step S3 above. Similarly, topics covered by the set of help documents which are least accessed by program users from a specific context can be identified as those topics having the lowest topic-based context weights. Topics not accessed at all from a given context will be identified as those having a topic-based context weight of zero. Help documents (as opposed to topics) within the set of help documents which are least accessed by program users from a specific context can be readily identified by simply correlating together document access with the context from which the access has been made. One or more help documents and/or pages within help documents which relate to a particular topic heading can be isolated and displayed simply based on the analysis performed at the step S1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structure in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may computer copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FGPA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture instructing instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart of block diagrams may represent a module, segment, or portion of instruction, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of identifying topics which a user requires help with when using a software program, comprising:
   for each of a plurality of help documents, associating with the help document a set of topics and their relative prevalence within the help document;
   tracking user access to the help documents during use of the software program; and
   identifying topics in relation to which help was required during use of the software program based on an amount of access to one or more of the help documents and the relative prevalence of topics within the accessed help documents, wherein the identifying includes calculating, for each topic included within the accessed help documents, an access weight for that topic, the access weight being a function of a sum over all accessed documents of a product of the prevalence of the topic in the document and the amount of access to the document during use of the software program.

2. A method according to claim 1, wherein the amount of access is one of a number of times the help document has been accessed and a duration of access to the help document.

3. A method according to claim 1, comprising generating a topic model for the plurality of help documents, the topic model defining the set of topics and the relative prevalence of those topics within each of the help documents.

4. A method according to claim 3, wherein the topic model defines a distribution of words within each topic.

5. A method according to claim 1, wherein tracking of user access to the help documents occurs over a predetermined period of time.

6. A method according to claim 1, comprising tracking an application context at a time a user accessed the help documents.

7. A method according to claim 6, wherein identifying topics in relation to which help was required during use of the software program comprises calculating, for each topic included within the accessed help documents, a topic based context weight for that topic, the topic based context weight being indicative of the amount of access to that topic from a given application context.

8. A method according to claim 7, wherein the topic based context weight is a function of a sum over all accessed documents of a product of the prevalence of the topic in the document and the amount of access to the document from the given application context.

9. A method according to claim 8, comprising providing a list of contexts ordered by their topic based context weights.

10. A method according to claim 1, comprising presenting the identified topics on a display.

11. A method according to claim 10, wherein the identified topics are presented to the user via a word cloud of topic labels, in which a display size of a topic label is proportional to an amount of access to that topic.

12. A method according to claim 10, wherein the identified topics can be selected by a user to obtain information regarding access to the topic by a user.

13. A method according to claim 12, wherein the information regarding access comprises a number of times a topic was considered by users.

14. A method according to claim 1, comprising tracking access by a plurality of users to identify topics with which users required the most help during use of the software program.

15. A method according to claim 1, comprising identifying topics and/or help documents within the set of help documents which are least accessed by users.

16. A method according to claim 1, comprising isolating and displaying one or more help documents and/or pages within help documents which relate to a particular topic heading.

17. An apparatus for identifying topics which a user requires help with when using a software program, comprising:
a document processor, operable to associate, for each of a plurality of help documents, the help document with a set of topics and their relative prevalence within the help document;
a help document tracker, operable to track user access to the help documents during use of the software program; and
a topic analyser, operable to identify topics in relation to which help was required during use of the software program based on an amount of access to one or more of the help documents and the relative prevalence of topics within the accessed help documents, wherein the identifying includes calculating, for each topic included within the accessed help documents, an access weight for that topic, the access weight being a function of a sum over all accessed documents of a product of the prevalence of the topic in the document and the amount of access to the document during use of the software program.

18. A computer program product for identifying topics which a user requires help with when using a software program, the computer program product comprising a computer readable storage medium having program instructions embodied therewith, the program instructions executable by a data processing apparatus to cause the data processing apparatus to perform a method comprising:
for each of a plurality of help documents, associating with the help document a set of topics and their relative prevalence within the help document;
tracking user access to the help documents during use of the software program; and
identifying topics in relation to which help was required during use of the software program based on an amount of access to one or more of the help documents and the relative prevalence of topics within the accessed help documents, wherein the identifying includes calculating, for each topic included within the accessed help documents, an access weight for that topic, the access weight being a function of a sum over all accessed documents of a product of the prevalence of the topic in the document and the amount of access to the document during use of the software program.

* * * * *